(12) United States Patent
Song et al.

(10) Patent No.: US 11,543,808 B2
(45) Date of Patent: Jan. 3, 2023

(54) SENSOR ATTRIBUTION FOR ANOMALY DETECTION

(71) Applicant: NEC Laboratories America, Inc., Princeton, NJ (US)

(72) Inventors: Dongjin Song, Princeton, NJ (US); Takehiko Mizoguchi, West Windsor, NJ (US); Cristian Lumezanu, Princeton Junction, NJ (US); Haifeng Chen, West Windsor, NJ (US)

(73) Assignee: NEC Corporation

( * ) Notice: Subject to any disclaimer, the term of this patent is extended or adjusted under 35 U.S.C. 154(b) by 0 days.

(21) Appl. No.: 17/223,251

(22) Filed: Apr. 6, 2021

(65) Prior Publication Data

US 2021/0341910 A1 Nov. 4, 2021

Related U.S. Application Data

(60) Provisional application No. 63/006,803, filed on Apr. 8, 2020.

(51) Int. Cl.
 *G05B 19/418* (2006.01)
(52) U.S. Cl.
 CPC ... *G05B 19/41875* (2013.01); *G05B 19/4183* (2013.01)
(58) Field of Classification Search
 CPC .......... G05B 19/41875; G05B 19/4183; G05B 23/0235; G05B 23/0289; G05B 19/4184; G05B 2219/31294; Y02P 90/02; Y02P 90/30
 See application file for complete search history.

(56) References Cited

U.S. PATENT DOCUMENTS

| | | | |
|---|---|---|---|
| 2008/0097662 A1 | 4/2008 | Volponi | |
| 2014/0195184 A1* | 7/2014 | Maeda | G01M 99/00 |
| | | | 702/183 |
| 2016/0210556 A1* | 7/2016 | Ben Simhon | G06N 20/00 |
| 2019/0188584 A1* | 6/2019 | Rao | G06N 20/00 |
| 2020/0074275 A1 | 3/2020 | Xia et al. | |
| 2020/0133253 A1* | 4/2020 | Huang | G05B 23/0254 |

FOREIGN PATENT DOCUMENTS

WO WO-2020157220 A1 * 8/2020 ........... G05B 23/024

* cited by examiner

*Primary Examiner* — Christopher E. Everett
(74) *Attorney, Agent, or Firm* — Joseph Kolodka

(57) ABSTRACT

Methods and systems for detecting and correcting anomalies includes generating historical binary codes from historical time series segments. The historical time series segments are each made up of measurements from respective sensors. A latest binary code is generated from a latest time series segment. It is determined that the latest time series segment represents anomalous behavior, based on a comparison of the latest binary code to the historical binary codes. The sensors are ranked, based on a comparison of time series data of the sensors in the latest time series segment to respective time series data of the historical time series, to generate a sensor ranking. A corrective action is performed responsive to the detected anomaly, prioritized according to the sensor ranking.

16 Claims, 5 Drawing Sheets

SENSOR ATTRIBUTION FOR ANOMALY DETECTION

RELATED APPLICATION INFORMATION

This application claims priority to U.S. Patent Application No. 63/006,803, filed on Apr. 8, 2020, incorporated herein by reference in its entirety.

BACKGROUND

Technical Field

The present invention relates to time series analysis and anomaly detection, and, more particularly, to the identification of particular time series that contribute to a classification of a system's state.

Description of the Related Art

Complex systems, such as in modern manufacturing industries, power plants, and information services, are difficult to monitor due to the large number of sensors that may be installed, each generating respective time series information. For example, temperature and pressure sensors may be distributed throughout a power plant. It is challenging to identify anomalous behavior across such complex systems, and it can be even more challenging to identify which particular sensors are the source of an anomalous reading.

SUMMARY

A method for detecting and correcting anomalies includes generating historical binary codes from historical time series segments. The historical time series segments are each made up of measurements from respective sensors. A latest binary code is generated from a latest time series segment. It is determined that the latest time series segment represents anomalous behavior, based on a comparison of the latest binary code to the historical binary codes. The sensors are ranked, based on a comparison of time series data of the sensors in the latest time series segment to respective time series data of the historical time series, to generate a sensor ranking. A corrective action is performed responsive to the detected anomaly, prioritized according to the sensor ranking.

A method for detecting and correcting anomalies includes generating historical binary codes from historical time series segments. The historical time series segments are each made up of measurements from respective sensors. A latest binary code is generated from a latest time series segment. It is determined that the latest time series segment represents anomalous behavior, based on a comparison of the latest binary code to the historical binary codes, including grouping the historical time series segments in buckets according to prefixes of the historical binary codes and determining exemplars of the buckets. The comparison of the latest binary code to the historical binary codes includes comparing the latest binary code to binary codes of the exemplars. The sensors are ranked, based on a comparison of measured values of the sensors in the latest time series segment to respective time series data of the historical time series, comparing the latest time series segment to each of the exemplars, to generate a sensor ranking. A corrective action is performed responsive to the detected anomaly, prioritized according to the sensor ranking.

A system for detecting and correcting anomalies includes a hardware processor and a memory that stores computer program code. When executed by the hardware processor, the computer program code causes the hardware processor to generate historical binary codes from historical time series segments, to generate a latest binary code from a latest time series segment, to determine that the latest time series segment represents anomalous behavior, based on a comparison of the latest binary code to the historical binary codes, to rank the sensors, based on a comparison of time series data of the sensors in the latest time series segment to respective time series data of historical time series, to generate a sensor ranking, to and perform a corrective action responsive to the detected anomaly, prioritized according to the sensor ranking. The historical time series segments are each made up of measurements from respective sensors;

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Historical time series data from a cyber-physical system may be represented as a compact binary code. The binary code makes it easier to efficiently and effectively retrieve similar time series segments from historical samples, to be used in classifying the current system status. For a given time series query, for example representing a present state of the cyber-physical system, it can be challenging to identify particular sensors and time series that determine the classification of the system state. The present attribution analysis can use learned binary codes to identify the relevant time series, based on the current status of the system.

Figure 1:
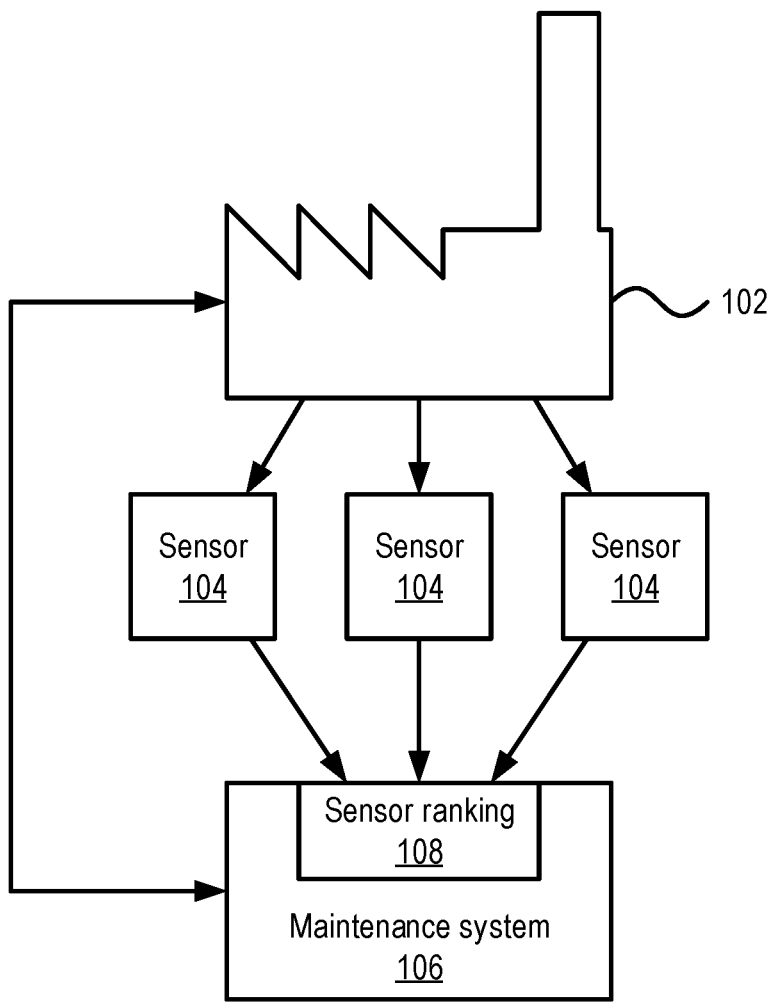
FIG. 1 is a diagram of a cyber-physical system that is monitored for anomalies, in accordance with an embodiment of the present invention.

Referring now in detail to the figures in which like numerals represent the same or similar elements and initially to FIG. 1, a maintenance system 106 in the context of a monitored system 102 is shown. The monitored system 102 can be any appropriate system, including physical systems such as manufacturing lines and physical plant operations, electronic systems such as computers or other computerized devices, software systems such as operating systems and applications, and cyber-physical systems that combine physical systems with electronic systems and/or software systems. Exemplary systems 102 may include a wide range of different types, including power plants, data centers, and transportation systems.

One or more sensors 104 record information about the state of the monitored system 102. The sensors 104 can be any appropriate type of sensor including, for example, physical sensors, such as temperature, humidity, vibration, pressure, voltage, current, magnetic field, electrical field, and light sensors, and software sensors, such as logging utilities installed on a computer system to record information regarding the state and behavior of the operating system and applications running on the computer system. The information generated by the sensors 104 can be in any appropriate format and can include sensor log information generated with heterogeneous formats.

In particular embodiments, the sensor data 104 can also include a key performance indicator (KPI) measurement. In some embodiments, the KPI measurement may be the result of an inspection of a physical output of the monitored system 102, or can represent a determination of a quality of the physical output by any appropriate measurement or characteristic.

The sensors 104 may transmit the logged sensor information to an anomaly maintenance system 106 by any appropriate communications medium and protocol, including wireless and wired communications. The maintenance system 106 can, for example, identify abnormal behavior by monitoring the multivariate time series that are generated by the sensors 104. Once anomalous behavior has been detected, the maintenance system 106 communicates with a system control unit to alter one or more parameters of the monitored system 102 to correct the anomalous behavior. This action can be performed based on a sensor ranking 108, which identifies sensors 104 that are most associated with the determination of anomalous behavior.

Exemplary corrective actions include changing a security setting for an application or hardware component, changing an operational parameter of an application or hardware component (for example, an operating speed), halting and/or restarting an application, halting and/or rebooting a hardware component, changing an environmental condition, changing a network interface's status or settings, etc. The maintenance system 106 thereby automatically corrects or mitigates the anomalous behavior. By identifying the particular sensors 104 that are associated with the anomalous classification, the amount of time needed to isolate a problem can be decreased.

Each of the sensors 104 outputs a respective time series, which encodes measurements made by the sensor over time. For example, the time series may include pairs of information, with each pair including a measurement and a timestamp, representing the time at which the measurement was made. Each time series may be divided into segments, which represent measurements made by the sensor over a particular time range. Time series segments may represent any appropriate interval, such as one second, one minute, one hour, or one day. Time series segments may represent a set number of collection time points, rather than a fixed period of time, for example covering 100 measurements.

Each time series segment may be represented as a compact binary code. There are many ways to convert a time series into a binary code. For example, a continuously valued measurement may be converted to a binary code by setting a value of 1 for positive-valued measurements and a value of 0 for negative-valued measurements. Another exemplary conversion may identify a range of possible measurement values, with a 1 being set for measurement values that are in the higher half of the range and with a 0 being set for measurement values that are in the lower half of the range. Rather than a simple heuristic, a neural network system may be used to learn binary codes from a body of historical time series data. Thus, any appropriate binary code assignment scheme may be used. Each binary code may have the same length.

These binary codes may be used to represent the time series segments. Because a binary value occupies much less memory than an integer or floating point value, the binary code representation can be more efficiently used to train the classifier. A code dictionary furthermore can be built to maintain the association between the binary code and the original time series data.

Figure 2:
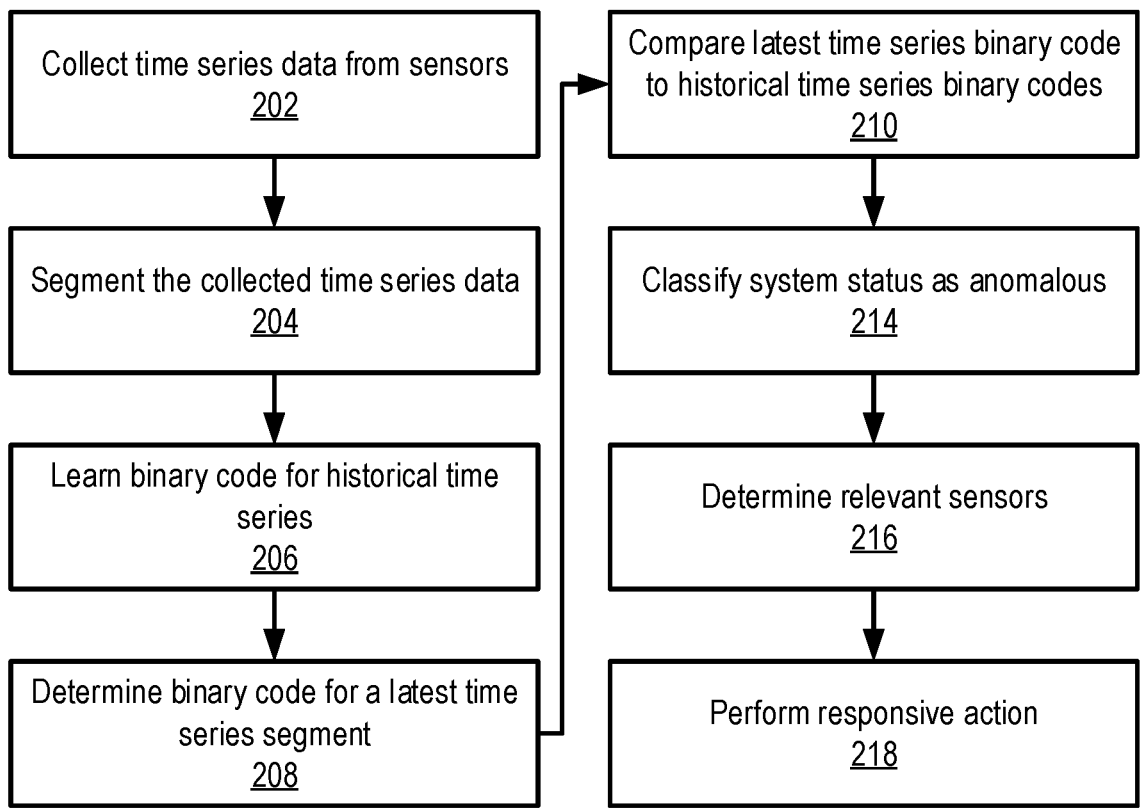
FIG. 2 is a block/flow diagram of a method of detecting and responding to anomalies in a cyber-physical system, in accordance with an embodiment of the present invention.

Referring now to FIG. 2, a method for detecting an anomaly is shown. Block 202 collects time series data from the sensors 104 of the cyber-physical system. This time series data may be considered separately, or may be collected into a multivariate time series, where all of the time series are considered together. Block 204 then segments the collected time series data. For example, multivariate time series data may be segmented by considering portions of the respective constituent time series across a same time period, such that measurements that are correlated in time are located together within a segment.

Block 206 determine binary codes for historical time series, for example using a heuristic or a neural network system. These may be time series that have been recorded over any length of time, with the binary codes of the historical time series forming a database of past behavior for the cyber-physical system. Block 208 then determines a binary code for a latest time series segment. For example, the latest time series segment may include time series information that has been recently collected from the sensors 104, representing a current, or nearly current, measurement of the state of the cyber-physical system.

Block 210 compares the latest time series binary code to the historical time series binary codes. This comparison may be performed by generating an anomaly score, for example as the minimum Hamming distance between the binary code of the latest time series segment and the binary codes of each of the historical time series segments. This anomaly score may represent how similar the latest time series segment is to at least one previously recorded time series segment. This step is described in greater detail below.

Block 214 uses the anomaly score to classify the latest time segment as anomalous. For example, this classification may include comparing the anomaly score to a threshold. When the anomaly score is above the threshold, that indicates that it is dissimilar to all of the historical time series, and is therefore anomalous.

Having determined that the cyber-physical system is in an anomalous state, block 216 determines which sensors 104 have contributed to that determination. As will be described in greater detail below, block 216 identifies the time series that are most associated with the anomaly, for example as a ranked set of sensors.

Block 218 then performs a responsive action. The ranked set of sensors can be used to determine which of the sensors 104 to respond to, thereby prioritizing the response. Multiple approaches that may be taken to selecting the subset of sensors. For example, the sensors 104 can be polled in ranked order to obtain diagnostic information. The responsive action can include diagnostics designed to acquire more information regarding the anomaly from the sensors 104. The responsive action can include sending an instruction to one or more sub-systems of the monitored system 102, to bring the sensor readings back to a "normal" state. Responsive actions may also include changing a setting or state of devices associated with the respective sensors 104. As noted above, automatic responsive actions may include changing a security setting for an application or hardware component, changing an operational parameter of an application or hardware component (for example, an operating speed), halting and/or restarting an application, halting and/or rebooting a hardware component, changing an environmental condition, changing a network interface's status or settings, etc.

Figure 3:
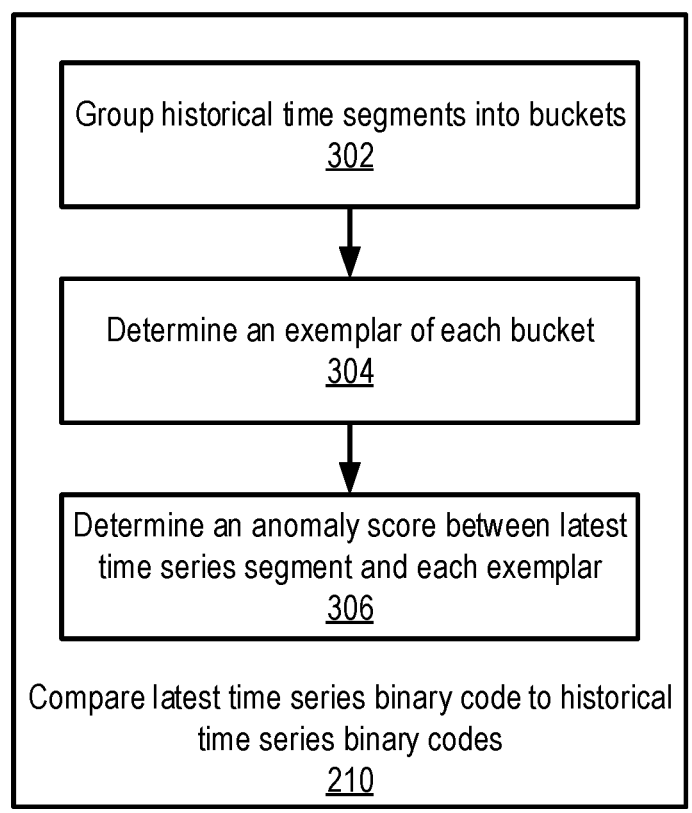
FIG. 3 is a block/flow diagram of a method for identifying anomalies using time series binary code representations, in accordance with an embodiment of the present invention.

Referring now to FIG. 3, additional detail is shown on how the latest time series binary code may be compared to historical time series binary codes in block 210. While it is possible to perform compare the latest time series code to every historical time series binary code individually, it may be more efficient to group the historical time series segments into buckets in block 302. An exemplar of each bucket may be determined in block 304. Rather than comparing against every historical time series binary code, the latest time series binary code may be compared against each exemplar in block 306 to determine the similarity score.

In cases where the binary codes are generated by a process that generates similar binary hashcodes for similar time series segments, a prefix of the hashcodes may be used to group the historical time series binary codes into buckets. For example, if the first eight bits of the hashcodes are considered, then the historical time series segments may be divided into 256 buckets. It should be understood that any appropriate grouping may be used to assign historical time segments into buckets.

In determining the exemplars in block 304, greater efficiency may be obtained by only considering those buckets which have a significant number of historical time series segments in them. For example, an exemplary may be formed for those buckets having 10% or more of the historical time series segments. This threshold determines how common a time series segment needs to be to be considered normal operation. Rare system states will be grouped into buckets that do not rise above the significance threshold, and therefore may be identified as anomalous, even if a new time series segment represents behavior that may have been seen on rare occasion previously.

The exemplar may be calculated to represent all of the time series segments in the bucket. For example, a historical time series segment binary code that is closest to the centroid of the time series segment binary codes in a given bucket may be used as the exemplar of that bucket. However, it should be understood that any appropriate exemplar may be selected to represent the bucket.

In general, the buckets may represent groups of time series segment binary codes with mostly the same class label, though exceptions are permitted. For example, a given bucket may include binary codes of time series segments, the majority of which have been classified as being "normal," with some that have been classified as being "failure" states.

In block 306 then, the anomaly score may be calculated between the latest time series segment and each of the exemplars. In some cases, the raw time series data of the latest time series segment may be compared to the raw time series data of the exemplar, for example using the Hamming distance, where greater differences between two binary codes produces a higher score output. The minimum of these Hamming distances may be used as the anomaly score, representing the highest degree of similarity between the latest time series binary code and the exemplars.

Figure 4:
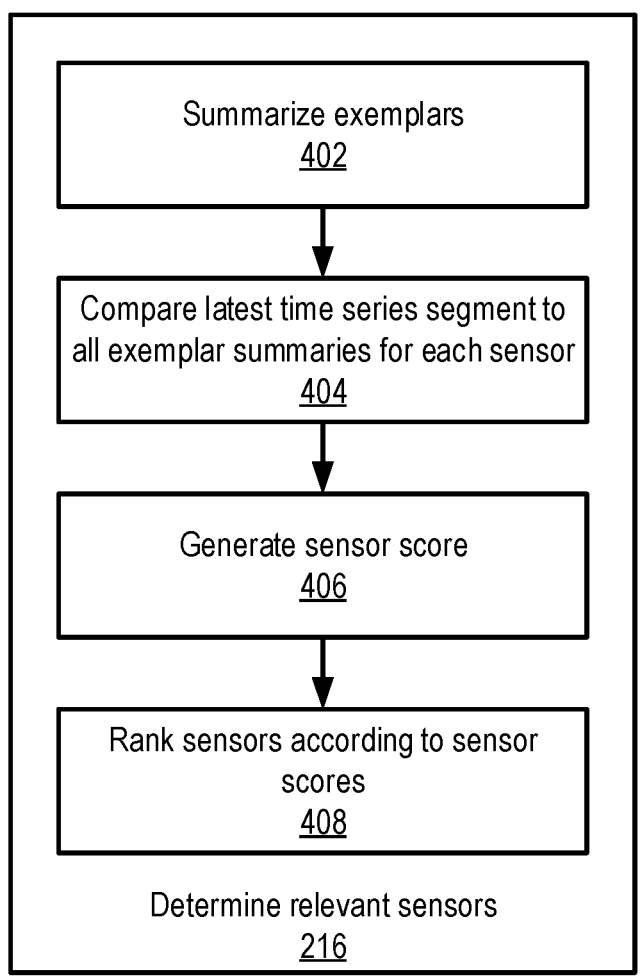
FIG. 4 is a block/flow diagram of a method for identifying sensors that generate time series information relevant to the identification of an anomaly, in accordance with an embodiment of the present invention.

Referring now to FIG. 4, additional detail on determining the relevant sensors in block 216 is shown. Block 402 summarizes the exemplars. This summarization may include averaging the measurements from each sensor in the exemplar. For example, if the time series segments each include ten measurements from each sensor, then the exemplar summary may include a vector with a number of values that corresponds to the number of sensors 104, with each value of the vector being an average of the values measured by the respective sensor during a respective time period.

Block 404 compares the latest time series segment summary to each of the exemplar summaries. This comparison may include, for example, determining a divergence vector between the sensor values of the latest time series segment and the sensor values of each of the exemplars. Whereas the binary codes are compared to determine the anomaly scores of block 306, block 404 may compare the raw data of the respective time series segments. This divergence vector may be used to determine a sensor score in block 406. Block 408 then ranks the sensors 104 according to the sensor score.

For example, the time segments may each be a w×n matrix, where w may be the size of the window and n may be the number of sensors 104. A divergence may be determined between the latest time segment and each of the exemplars in block 404 by calculating an absolute difference between the averages of each sensor value of each exemplar and the latest time series segment. The absolute difference for each exemplar may then be determined as a 1×n vector. Block 406 identifies the minimum absolute distance across the exemplars. These minimum absolute distances may be collected into another 1×n vector, representing a score for each sensor.

The determination of the sensor score identifies specific sensor values that deviate from the sensor values that are present during normal operation. By ranking sensors 104 according to the sensor scores, those sensors with readings that the deviate most will be prioritized for response.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 5:
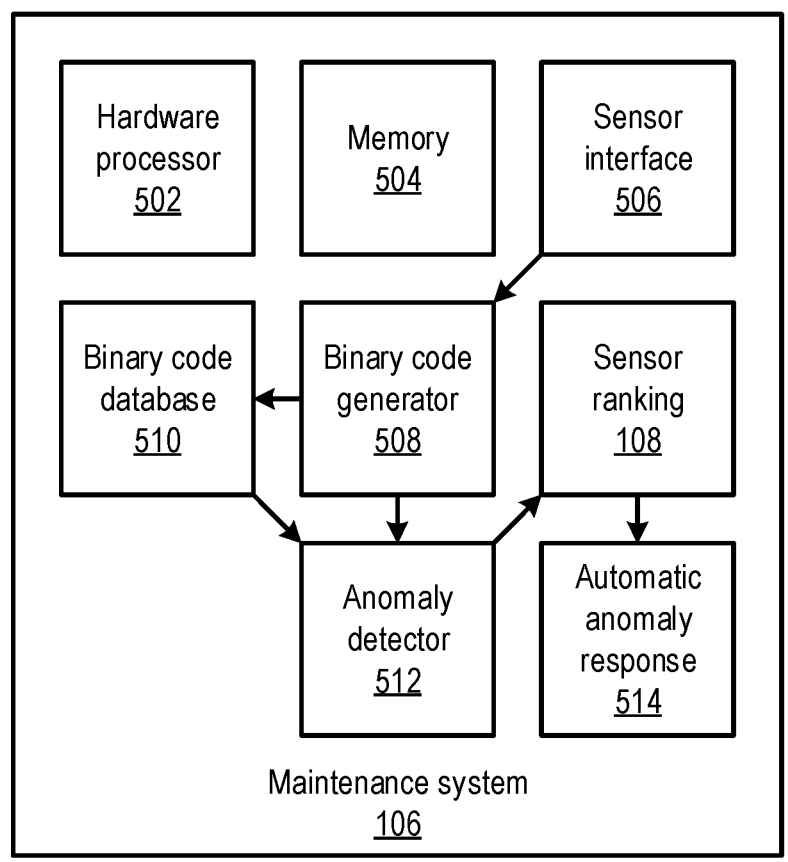
FIG. 5 is a block diagram of a maintenance system for a cyber-physical system that detects and responds to anomalies, in accordance with an embodiment of the present invention.

Referring now to FIG. 5, additional detail on the maintenance system 106 is shown. The system 106 includes a hardware processor 502 and memory 504. The system 106 may include one or more functional modules, each of which may be implemented as software that is stored in the memory 504 and that is executed by the hardware processor. Some or all of the functional modules may be implemented as discrete hardware components, for example in the form of an ASIC or FPGA.

A sensor interface 506 receives time series data from the sensors 104. The sensor interface 506 may include dedicated connections, which communicate with specific sensors 104, as well as a general interface that may communicate with multiple sensors, for example over a computer network. The sensor interface 506 may include any appropriate combination of wired and wireless communications media and protocols. A network interface 507 communications with the monitored system 102, for example by providing instructions to particular devices or sub-systems. The network interface 507 may include any appropriate communications medium and protocol.

A binary code generator 508 processes the received time series data, splitting the data into segments and generating respective binary codes. After being generated, the binary codes may be stored in a binary code database 510 that maintains historical time series data.

An anomaly detector 512 receives a binary code of a latest time series segment and compares it with the binary codes of historical time series segments in the binary code database 510. The anomaly detector 512 assigns the binary code database 510 to different buckets, for example based on their binary codes' prefixes, and compares the latest time series segment to the exemplars of buckets that have a significant number of member segments. Based on the comparison, the anomaly detector 512 determines whether the latest time series segment represents anomalous behavior.

If so, then a sensor ranking 108 is generated, by comparing averages of the respective raw sensor values of the anomalous time segment to averages of the respective raw sensor values of the different exemplars. The sensors 104 are then ranked, in accordance with how dissimilar their respective sensor measurements in the latest time series segment are from historical measurements from the same sensor.

An automatic anomaly response 514 is then generated. The automatic anomaly response 514 may include a controller that automatically responds to the flagged anomalies by triggering a corrective action, using the network interface 507. The corrective action can include diagnostics designed to acquire more information regarding the anomaly from the sensors 104. The corrective action can include sending an instruction to one or more sub-systems of the monitored system 102, to bring the sensor readings back to a "normal" state. The automatic anomaly response 514 may select an action based on the sensor ranking 108, for example using the ranking to identify particular devices or sub-systems of the monitored system 102 that may be associated with abnormal sensor readings.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method of detecting and correcting anomalies, comprising:
   generating historical binary codes from a plurality of historical time series segments, the plurality of historical time series segments each being made up of measurements from respective sensors;
   generating a latest binary code from a latest time series segment;
   determining that the latest time series segment represents anomalous behavior, based on a comparison of the latest binary code to the historical binary codes, including:
      grouping the historical time series segments in buckets; and
      determining exemplars of the buckets as time series segments that are nearest to a centroid of the historical time series grouped into a respective bucket, wherein the comparison of the latest binary code to the historical binary codes includes comparing the latest binary code to binary codes of the exemplars;
   ranking the sensors, based on a comparison of time series data of the sensors in the latest time series segment to respective time series data of the plurality of historical time series, to generate a sensor ranking; and
   performing a corrective action responsive to the detected anomaly, prioritized according to the sensor ranking.

2. The method of claim 1, wherein the historical time series segments are grouped into buckets according to prefixes of the historical binary codes.

3. The method of claim 1, wherein determining the exemplars of the buckets includes determining exemplars for only those buckets which have an above-threshold percentage of the plurality of historical time series segments.

4. The method of claim 1, wherein ranking the sensors comprises determining a difference between sensor values of the latest time series segment and sensor values of each of the exemplars.

5. The method of claim 4, wherein ranking the sensors further comprises determining a divergence vector from the differences, with each value of the divergence vector representing a ranking score of the sensors.

6. The method of claim 5, wherein each value of the divergence vector is determined as a minimum absolute difference of a corresponding sensor across the exemplars.

7. The method of claim 1, wherein the comparison of the latest binary code to the historical binary codes includes determining a Hamming distance between the latest binary code and each of the historical binary codes.

8. The method of claim 1, wherein the corrective action includes an action selected from the group consisting of changing a security setting for an application or hardware component, changing an operational parameter of an application or hardware component, halting an application, restarting an application, halting a hardware component, rebooting a hardware component, changing an environmental condition, and changing a network interface's status.

9. A method of detecting and correcting anomalies, comprising:
   generating historical binary codes from a plurality of historical time series segments, the plurality of historical time series segments each being made up of measurements from respective sensors;
   generating a latest binary code from a latest time series segment;
   determining that the latest time series segment represents anomalous behavior, based on a comparison of the latest binary code to the historical binary codes, including:
      grouping the historical time series segments in buckets according to prefixes of the historical binary codes; and
      determining exemplars of the buckets for only those buckets which have an above-threshold percentage of the plurality of historical time series segments, wherein the comparison of the latest binary code to the historical binary codes includes comparing the latest binary code to binary codes of the exemplars;
   ranking the sensors, based on a comparison of measured values of the sensors in the latest time series segment to respective time series data of the plurality of historical time series, comparing the latest time series segment to each of the exemplars, to generate a sensor ranking; and
   performing a corrective action responsive to the detected anomaly, prioritized according to the sensor ranking.

10. A system for detecting and correcting anomalies, comprising:
    a hardware processor; and
    a memory that stores computer program code, which, when executed by the hardware processor, causes the hardware processor to:
       generate historical binary codes from a plurality of historical time series segments, the plurality of historical time series segments each being made up of measurements from respective sensors;
       generate a latest binary code from a latest time series segment;
       determine that the latest time series segment represents anomalous behavior, based on a comparison of the latest binary code to the historical binary codes, including:
          a grouping of the historical time series segments in buckets; and
          a determination of exemplars of the buckets as time series segments that are nearest to a centroid of the historical time series grouped into a respective bucket, wherein the comparison of the latest binary code to the historical binary codes includes a comparison of the latest binary code to binary codes of the exemplars;

rank the sensors, based on a comparison of time series data of the sensors in the latest time series segment to respective time series data of the plurality of historical time series, to generate a sensor ranking; and perform a corrective action responsive to the detected anomaly, prioritized according to the sensor ranking.

11. The system of claim 10, wherein the historical time series segments are grouped into buckets according to prefixes of the historical binary codes.

12. The system of claim 10, wherein the computer program code further causes the hardware processor to determine exemplars for only those buckets which have an above-threshold percentage of the plurality of historical time series segments.

13. The system of claim 10, wherein the computer program code further causes the hardware processor to determine a difference between sensor values of the latest time series segment and sensor values of each of the exemplars.

14. The system of claim 13, wherein the computer program code further causes the hardware processor to determine a divergence vector from the differences, with each value of the divergence vector representing a ranking score of the sensors.

15. The system of claim 14, wherein each value of the divergence vector is determined as a minimum absolute difference of a corresponding sensor across the exemplars.

16. The system of claim 10, wherein the corrective action includes an action selected from the group consisting of changing a security setting for an application or hardware component, changing an operational parameter of an application or hardware component, halting an application, restarting an application, halting a hardware component, rebooting a hardware component, changing an environmental condition, and changing a network interface's status.

* * * * *